US007012545B2

(12) United States Patent
Skinner et al.

(10) Patent No.: US 7,012,545 B2

(45) Date of Patent: Mar. 14, 2006

(54) ANNULUS PRESSURE OPERATED WELL MONITORING

(75) Inventors: Neal G. Skinner, Lewisville, TX (US); Michael L. Fripp, Carrollton, TX (US); Roger L. Schultz, Aubrey, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 808 days.

(21) Appl. No.: 10/077,052

(22) Filed: Feb. 13, 2002

(65) Prior Publication Data

US 2003/0151523 A1 Aug. 14, 2003

(51) Int. Cl.
*G01V 3/18* (2006.01)

(52) U.S. Cl. .................. 340/855.8; 166/65.1; 166/66.5

(58) Field of Classification Search ............. 340/855.8, 340/855.4, 853.7, 854.3; 166/65.1, 66.5; 324/333, 338, 351; 367/82

See application file for complete search history.

(56) References Cited

U.S. PATENT DOCUMENTS

| | | | | |
|---|---|---|---|---|
| 4,422,506 A | | 12/1983 | Beck | |
| 4,429,748 A | | 2/1984 | Beck | |
| 4,444,267 A | | 4/1984 | Beck | |
| 4,444,268 A | | 4/1984 | Barrington | |
| 4,515,219 A | | 5/1985 | Beck | |
| 4,537,258 A | | 8/1985 | Beck | |
| 4,633,952 A | | 1/1987 | Ringgenberg | |
| 4,667,743 A | | 5/1987 | Ringgenberg et al. | |
| 4,711,305 A | | 12/1987 | Ringgenberg | |
| 4,736,798 A | | 4/1988 | Zunkel | |
| 5,839,508 A | * | 11/1998 | Tubel et al. | 166/65.1 |
| 6,747,569 B1 | * | 6/2004 | Hill et al. | 340/855.8 |

* cited by examiner

*Primary Examiner*—Michael Horabik
(74) *Attorney, Agent, or Firm*—Marlin R. Smith

(57) ABSTRACT

A method is provided for monitoring a well. In a described embodiment, the method uses annulus pressure to communicate between a downhole system and a remote location. The method may use intermittent electrical power generated by changes in annulus pressure to power the downhole system. Various sensors and well tools may be monitored and actuated by the downhole system, and acquired data may be transmitted to the remote location.

21 Claims, 12 Drawing Sheets

ANNULUS PRESSURE OPERATED WELL MONITORING

BACKGROUND

The present invention relates generally to operations performed in conjunction with subterranean wells and, in an embodiment described herein, more particularly provides a method of monitoring a well using annulus pressure manipulations.

Various methods have been used in the past for remotely communicating with a downhole location. For example, electromagnetic telemetry, acoustic telemetry, mud pulse telemetry during drilling operations, etc. However, each of these methods has its drawbacks when used for permanent well monitoring.

Electromagnetic and acoustic telemetry each require a downhole power source, such as a battery. The downhole power source is needed to power downhole electronic circuits and sensors. The actual transmission of electromagnetic or acoustic waves from a downhole location to a remote location, such as the earth's surface, requires a substantial amount of power.

If this power is supplied by batteries, then they will need to be frequently refreshed or recharged. This will necessitate intervention into the well and interruption of the production flow from the well, each of which is costly. If the power is supplied by lines extending into the well, the lines are costly to install and are subject to damage throughout the productive life of the well.

Mud pulse telemetry requires a circulating fluid flow. In a producing well, fluid typically flows upward through a tubing string, and an annulus surrounding the tubing string is maintained at a static pressure, with no communication between the tubing and the annulus. Power to operate the downhole mud pulse telemetry equipment may be supplied by batteries, by lines extending to the surface, or by the fluid circulation. However, as discussed above, batteries and lines extending to the surface have certain drawbacks when used for long term well monitoring, and fluid circulation is not available.

Therefore, it may be seen that there is a need for a method whereby a well may be conveniently and economically monitored on a long term basis. Methods and equipment suitable for this purpose could also be used for other purposes.

SUMMARY

In carrying out the principles of the present invention, in accordance with an embodiment thereof, a method is provided which permits long term monitoring of a well. The method described herein does not require the use of electrical lines to transmit data or electrical power, does not require the use of batteries downhole, and does not rely on electromagnetic, acoustic or mud pulse telemetry for communication with a remote location.

In one aspect of the invention, a method is provided for communicating between a downhole system and a remote location. The method uses intermittent electrical power in the form of spaced apart transmissions of electrical power. Individual bits of data bytes are communicated to the remote location when the separate electrical power transmissions are received in the downhole system. The same or alternating electrical power transmissions may be used to set the bits for telemetry in the downhole system.

In another aspect of the invention, a method of communicating between a downhole system and a remote location includes the steps of generating a spaced apart series of electrical transmissions in response to a spaced apart series of pressure changes in a well, acquiring into the downhole system at least one byte of data from a downhole sensor, and transmitting to the remote location individual bits of the byte in response to respective separate ones of the series of pressure changes.

In yet another aspect of the invention, a method for communicating between a downhole system and a remote location is provided which includes the step of selectively altering an effective volume in a well, thereby indicating a corresponding bit of a byte of data to be transmitted. Pressure in the well is changed and the effective volume of the well is detected, thereby determining the corresponding transmitted bit. These steps are repeated to transmit each bit of the data byte.

In still another aspect of the invention, a method for communicating between a remote location and a downhole system is provided which includes the step of selectively changing pressure in a well to first and second predetermined pressures, thereby transmitting bit values corresponding to the respective predetermined pressures. In one described embodiment, the predetermined pressures are applied at the remote location to an annulus of the well. The annulus pressure is monitored at the downhole system.

When one of the predetermined pressures is detected in the annulus, the downhole system detects that a corresponding bit value has been transmitted, and the bit value is stored in a shift register. The bits stored in the shift register are compared to a series of codes and, if a match is found, a function corresponding to the code is performed by the downhole system.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
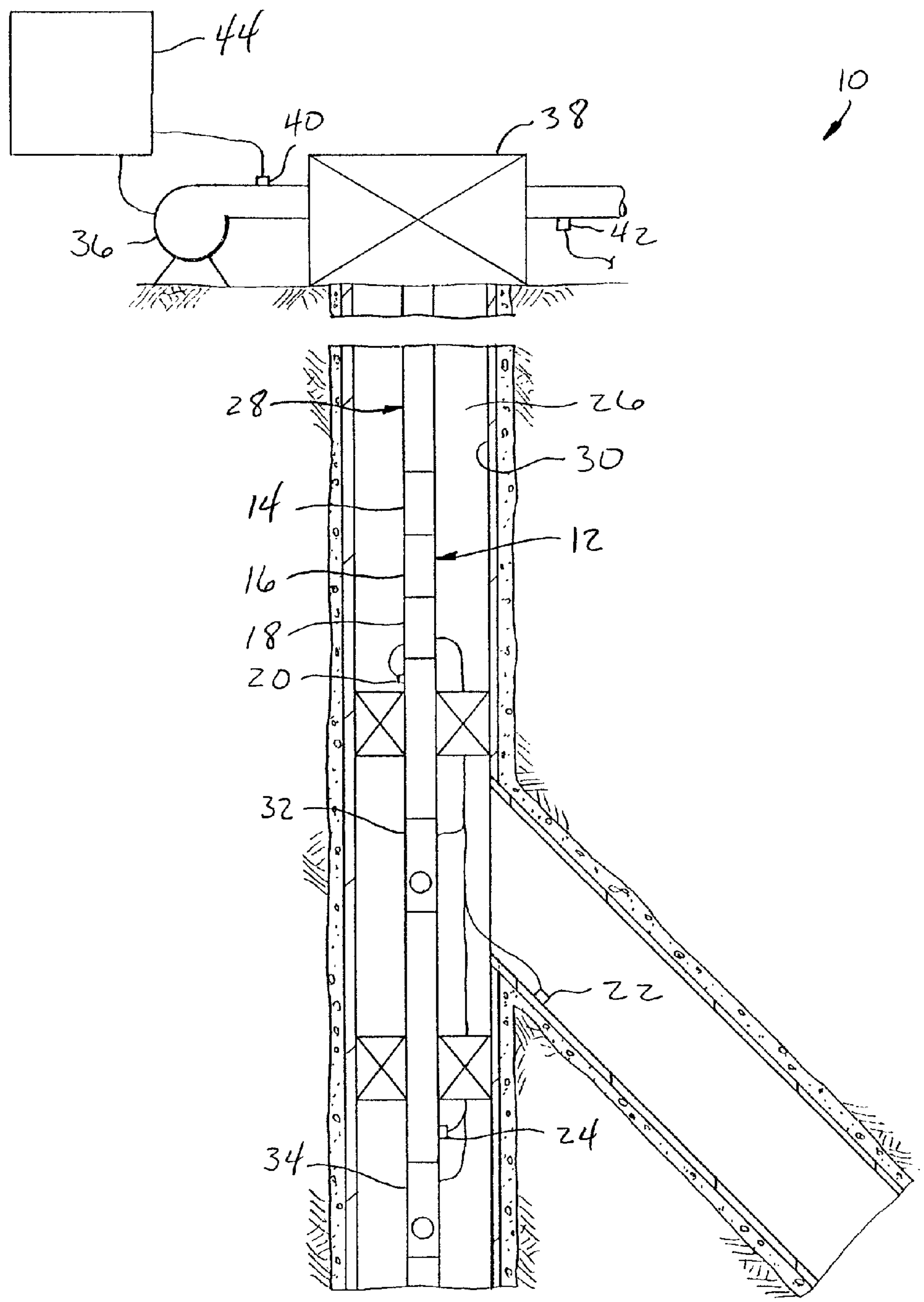
FIG. 1 is a schematic cross-sectional view of a method of monitoring a well, the method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10, it is desired to monitor various parameters in a well, communicate between a downhole system 12 and a remote location, such as the earth's surface, and perform certain functions in the well. As depicted in FIG. 1, the downhole system includes a telemetry module 14, a generator module 16 and a controller module 18. Although these elements are shown as separate modules 14, 16, 18, they may be combined into the same apparatus, or they may be otherwise configured.

A downhole power generator which may be used for the generator module 16 is described in a copending application entitled ANNULUS PRESSURE OPERATED ELECTRIC POWER GENERATOR, having as inventors thereof Neal Skinner, Michael Fripp and Roger Schultz, and having application no. 10/026,175. The generator described in the copending application electrical power in response to changes in annulus pressure. Thus, the generated electrical power is intermittent, consisting of a series of spaced apart electrical power transmissions. A method of using this intermittent electrical power in the system 12 is described below.

Of course, other types of generators or other types of power sources may be used for the generator module 16. In fact, batteries or electrical transmission lines could be used in place of the generator module 16 if desired. However, electrical power is preferably generated downhole in the method 10.

The telemetry module 14 is used to transmit data acquired by the system 12 to the remote location. Various embodiments of the telemetry module 14 are described below. The data transmitted by the telemetry module 14 is acquired by means of sensors, such as sensors 20, 22, 24 positioned in the well.

Preferably, the sensor 20 is at least a pressure sensor for monitoring pressure in an annulus 26 formed between a tubing string 28 and a wellbore 30 of the well. The sensor 20 may also include a temperature sensor and/or any other type of sensor. The sensors 22, 24 may be pressure, temperature, flowrate, density, resistivity, water cut, gamma ray, pH, or any other types of sensors.

The sensors 20, 22, 24 are connected to the controller module 18, which is used for data acquisition and control of other portions of the system 12. Flow control devices, such as valves 32, 34, may also be controlled by the controller module 18, for example, by selectively actuating the valves to regulate production flow from the well. The valves 32, 34 may also include sensors, such as position sensors, so that the position of each of the valves may be detected by the controller module 18.

A pump 36 is used in the method 10 to apply pressure to the annulus 26 in communicating with the downhole system 12, for example, to receive data transmitted from the downhole system to the remote location, or to transmit commands or instructions to the downhole system from the remote location. As depicted in FIG. 1, the pump 36 is positioned at the remote location (the earth's surface), and the pump communicates with the annulus 26 via a wellhead 38. However, it should be clearly understood that the remote location could be elsewhere, such as a seabed in a subsea well, or within the well itself, etc., without departing from the principles of the invention.

Pressure applied to the annulus 26 is monitored at the remote location by a sensor 40. The sensor 40 may also include a flow rate sensor for monitoring the volume of fluid pumped into the annulus 26 by the pump 36. Alternatively, the pump 36 may itself include a means for sensing the volume of fluid discharged by the pump. Another sensor 42 may be used to sense the volume of fluid released from the annulus 26 when pressure therein is decreased.

The pump 36 and sensors 40, 42 are connected to a computer 44. The computer 44 is used to control operation of the pump 36 and monitor the outputs of the sensors 40, 42. In addition, predetermined pressures and pressure vs. volume relationships are stored in the computer 44 for purposes that will be explained below.

Figure 2:
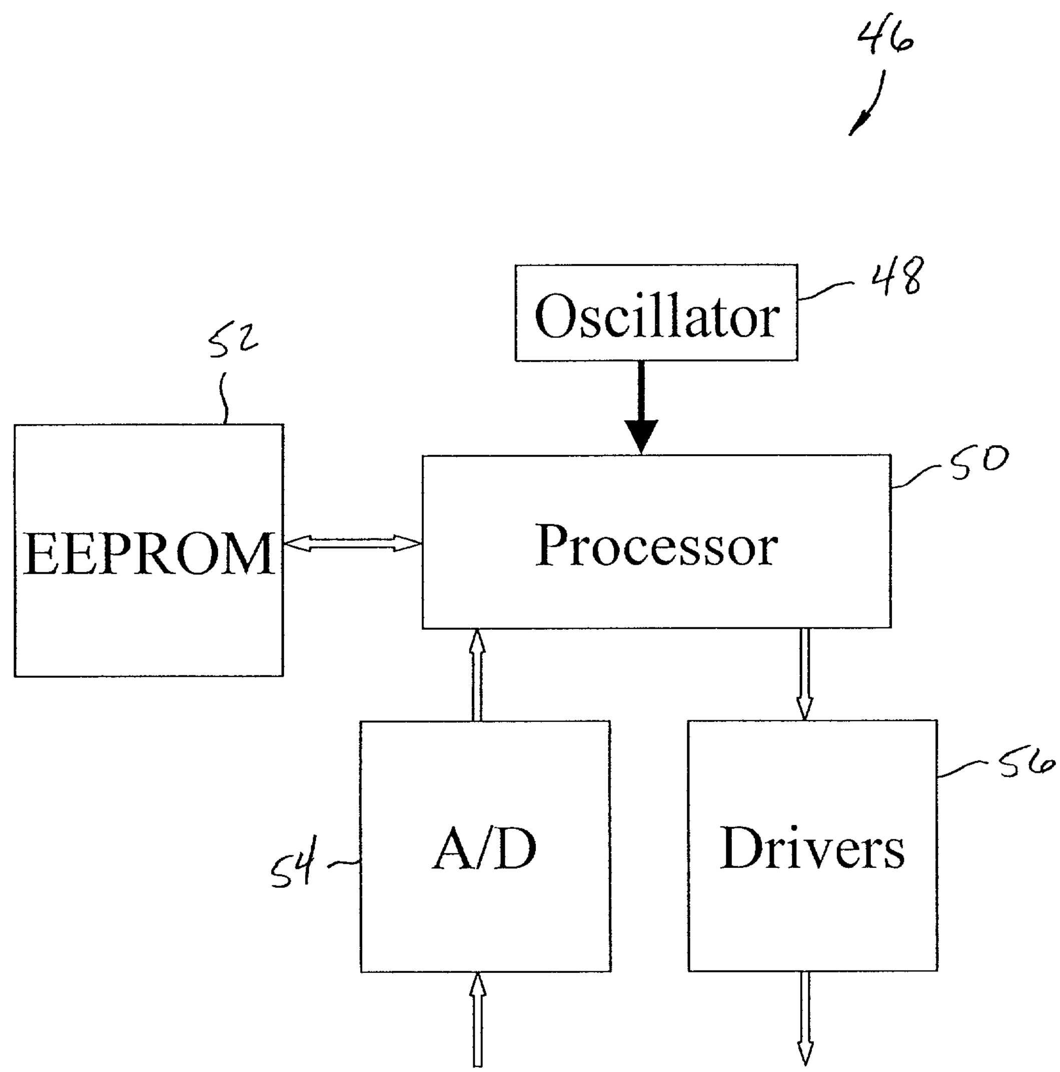
FIG. 2 is a schematic block diagram of a method of using intermittent electrical power which may be part of the method of FIG. 1.

Referring additionally now to FIG. 2, a schematic block diagram 46 of the controller module 18 is representatively illustrated. The controller module 18 preferably utilizes intermittent electrical power generated by the generator module 16 as described above. Continuous electrical power could be used alternatively, or in addition, in keeping with the principles of the invention.

An oscillator 48 provides clock signals to a processor 50. An EEPROM 52 or flash memory is connected to the processor 50 for nonvolatile data storage. This nonvolatile data storage is particularly useful in the periods between the electrical power transmissions when electrical power is not supplied to the controller module 18. Of course, if continuous power is available downhole there is no need for nonvolatile memory and another type of memory may be used in place of the EEPROM 52.

An analog to digital converter 54 is used to convert analog signals from the sensors 20, 22, 24 to digital signals usable by the processor 50. Various drivers 56 are used to actuate well tools connected to the controller module 18, such as the valves 32, 34 shown in FIG. 1.

Figure 3:
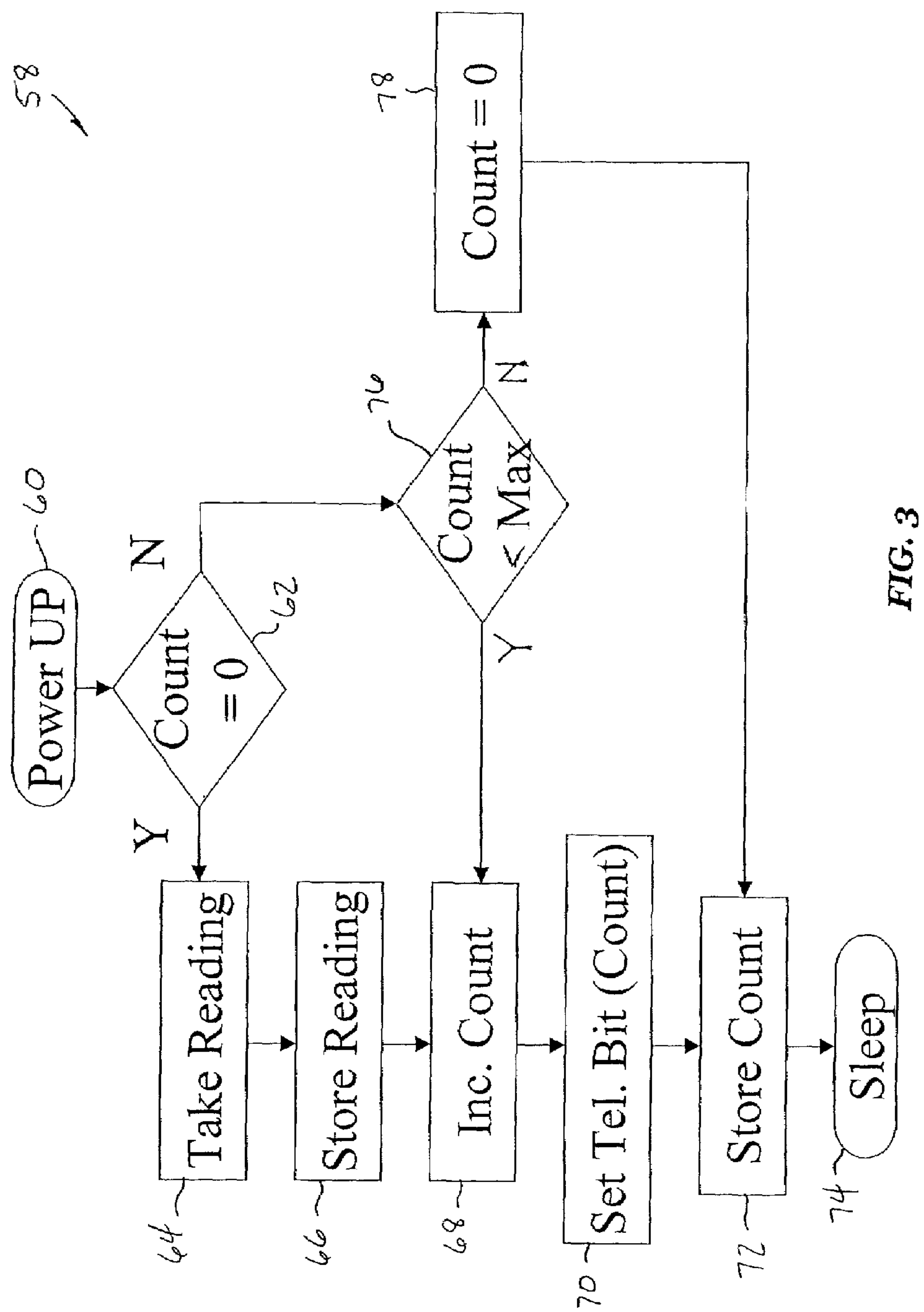
FIG. 3 is a flowchart illustrating steps in a method of monitoring a well and communicating monitored parameters which may be part of the method of FIG. 1.

Referring additionally now to FIG. 3, a flowchart 58 is representatively illustrated which includes steps performed in transmitting data from the downhole system 12 to the remote location in the method 10. The flowchart 58 is depicted as if intermittent electrical power is used in the downhole system 12, with the steps therein being performed when electrical power is received at the controller module 18 and prior to the electrical power ceasing. If continuous electrical power is available downhole, appropriate changes may be made to the steps in the flowchart 58.

If the annulus power operated generator (described in the incorporated copending application referred to above) is used for the generator module 16, then electrical power is generated by the generator and transmitted to the controller module 18 each time pressure in the annulus 26 is increased or decreased. The computer 44 may be programmed to operate the pump 36 so that pressure in the annulus 26 is alternately increased and decreased, thereby supplying a series of electrical power transmissions to the controller module 18 from the generator module 16.

Electrical power being received at the controller module 18 is represented by the beginning "power up" step 60 in the flowchart 58. The step 60 could represent each electrical power transmission received at the controller module 18, that is, each time pressure in the annulus 26 is increased or decreased. Preferably, however, step 60 represents only alternate power transmissions received in response to pressure changes in the annulus 26, that is, due only to pressure increases in the annulus, or due only to pressure decreases in the annulus.

Thus, the steps in the flowchart 58 are performed in response to alternate electrical power transmissions received at the controller module 18. It is further preferred that these alternate power transmissions are due only to pressure increases in the annulus 26. However, it is to be clearly understood that this is not necessary in keeping with the principles of the invention. For example, if continuous electrical power is available, the steps in the flowchart 58 could be performed at any time.

In step 62, the count value of a counter device is compared to zero. The count value is initially set to zero, so on the first instance of electrical power being received at the controller module 18, the count value is zero and steps 64, 66, 68, 70, 72 of the flowchart 58 are performed in succession. On subsequent instances of electrical power being received at the controller module 18, the count value may be nonzero, in which case step 76 would next be performed.

Assuming that the count value is zero, the next step is to take a reading from a sensor connected to the controller module 18, such as any one of the sensors 20, 22, 24. This step would be performed by the processor 50 via the analog to digital converter 54 as depicted in FIG. 2. The reading would typically comprise a byte of data which includes a number of bits.

In step 66, the reading (comprising the byte of data) is stored in the memory 52.

In step 68, the count value is incremented, i.e., the count value is increased by one. Assuming that the count value was previously zero, the count value will be one upon completion of step 68.

In step 70, a telemetry bit is set so that it corresponds to the data bit indicated by the count value. That is, if the count value is one, the first data bit is used to set the telemetry bit. If the count value is two, the second data bit is used to set the telemetry bit, etc. Thus, when the count value is nonzero, it indicates a corresponding one of the data bits which will be used to set the telemetry bit. The use of the telemetry bit will be described in further detail below.

In step 72, the count value is stored in the memory 52. In this manner, the count value will be available after electrical power to the controller module 18 ceases in the "sleep" step 74. On the next "power up" step 60, the stored count value will be retrieved, and step 62 will utilize the stored count value.

If the stored count value is nonzero in step 62, then in step 76 the count value is compared to a maximum bit number. As discussed above, the count value corresponds to a particular data bit. Therefore, if the count value is equal to or greater than the maximum bit number, then all of the data bits have been previously indicated.

If the count value is less than the maximum bit number in step 76, then steps 68, 70, 72 are performed in succession. Thus, the telemetry bit is set for each nonzero count value, from one up to the maximum number of bits. In this way, the telemetry bit is set corresponding to each of the data bits in succession.

If in step 76 the count value is not less than the maximum number of bits, then the count value is reset to zero in step 78. This count value is then stored in step 72. On the next "power up" step 60, the comparison in step 62 will be affirmative and another reading will be taken and stored in steps 64, 66.

Therefore, when the count value is zero on power up, a reading is taken and stored, the count is incremented to one, and the telemetry bit is set to correspond to the data bit indicated by the incremented count value. If, on power up, the count value is nonzero but is less than the maximum number of data bits, then the count value is incremented and the telemetry bit is set to correspond to the data bit indicated by the incremented count value. If, on power up, the count value is nonzero but is not less than the maximum number of data bits, then the count value is reset to zero. In all of these circumstances, the incremented or reset count value is stored prior to the electrical power transmission to the controller module 18 ceasing in step 74.

Figure 4:
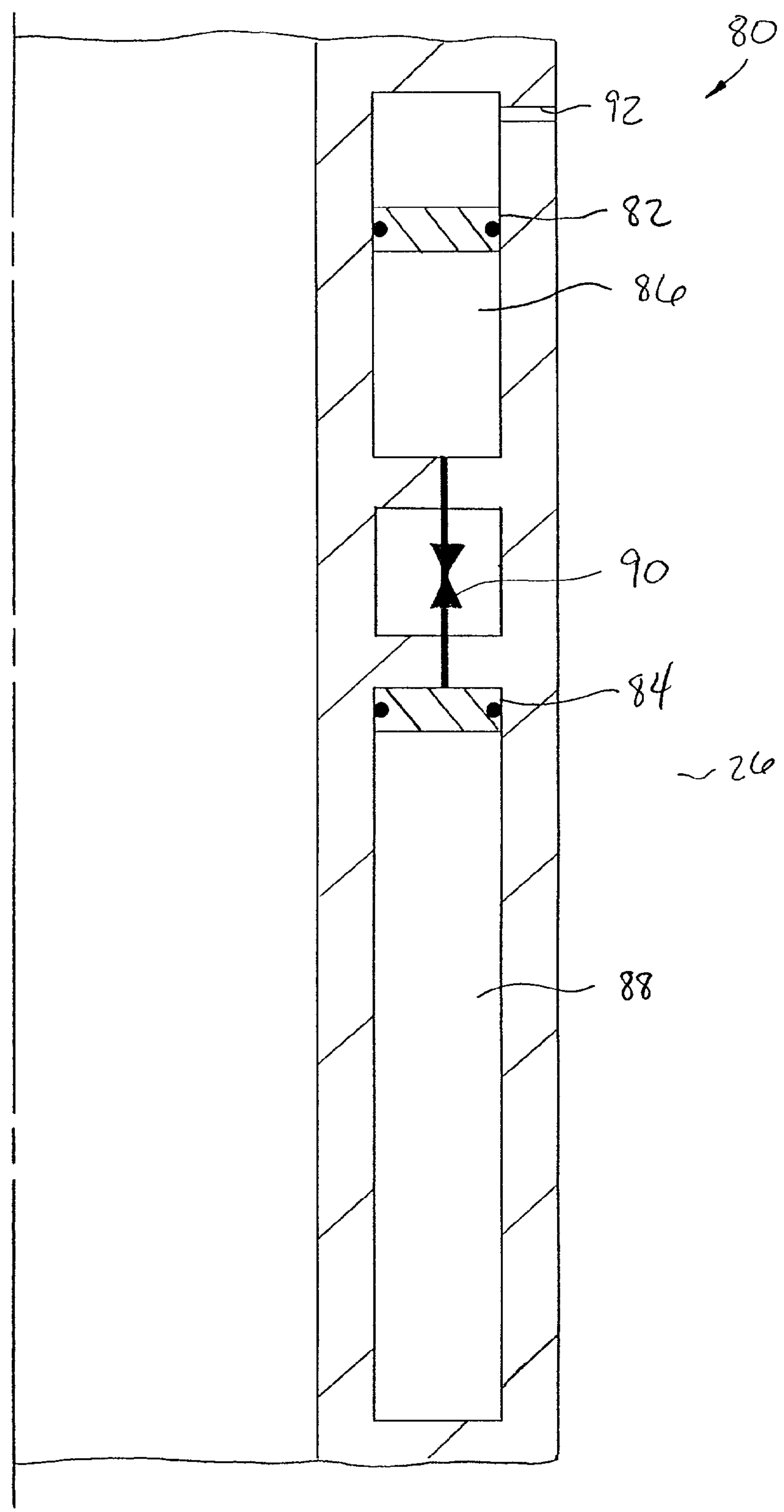
FIG. 4 is a schematic quarter-sectional view of a first apparatus which may be used in the method of FIG. 3.

Referring additionally now to FIG. 4, an apparatus 80 which may be used for the telemetry module 14 in the method 10 is representatively illustrated. In FIG. 4, the apparatus 80 is depicted as if it is interconnected in the tubing string 28 with the annulus 26 surrounding the apparatus. However, it is to be understood that the apparatus 80 may be used in other methods and may be otherwise positioned and configured, without departing from the principles of the invention.

The apparatus 80 includes two floating pistons 82, 84 sealingly and reciprocably received in respective chambers 86, 88. A valve device 90 selectively permits or prevents fluid communication between the chambers 86, 88.

The valve device 90 may be any type of device which functions to selectively permit and prevent flow between the chambers 86, 88. For example, the valve device 90 may be a conventional solenoid valve. Preferably, the valve device 90 is of the latching type, that is, once actuated to an open or closed position, the valve device remains in that position without the need for continued application of energy to the valve device. In this way, energy is conserved in the system 12.

A port 92 provides fluid communication between the annulus 26 and the chamber 86 above the upper piston 82. Thus, when the pump 36 applies pressure to the annulus 26, this pressure is transmitted to the piston 82, and when pressure is released from the annulus, it is also reduced on the piston 82.

In the chamber 86 below the upper piston 82 is a fluid, such as oil. This fluid will flow through the valve 90 to the chamber 88 above the lower piston 84 if the valve is open, and if the pressure in the upper chamber 86 is greater than the pressure in the lower chamber 88.

If this happens (fluid flows from the upper chamber 86 to the lower chamber 88 through the valve 90), then the upper and lower pistons 82, 84 will displace downwardly. Downward displacement of the upper piston 82 increases the effective volume of the annulus 26, since the chamber 86 volume above the piston 82 (which is in fluid communication with the annulus via the port 92) increases.

Thus, if the valve 90 is open and pressure is applied to the annulus 26 so that it becomes greater than pressure in the lower chamber 88, the effective volume of the annulus will be increased due to downward displacement of the upper piston 82. Therefore, a greater volume of fluid will need to be pumped into the annulus 26 by the pump 36 to achieve a certain pressure in the annulus, or a lesser pressure will be achieved for a given volume of fluid pumped into the annulus.

Likewise, if pressure in the annulus 26 is reduced after the upper piston 82 has been displaced downward and the effective volume of the annulus has been thereby increased, a greater volume of fluid will need to be released from the annulus to reduce the pressure in the annulus to a certain level, or the pressure in the annulus will be reduced to a lesser extent when a given volume of fluid is released from the annulus. Therefore, it will be readily appreciated by one skilled in the art that the open or closed position of the valve 90 may be readily determined at the remote location by merely increasing or decreasing the pressure in the annulus 26, and correspondingly adding or reducing the volume of fluid in the annulus.

Downward displacement of the lower piston 84 decreases the volume of the chamber 88 below the piston 84. Preferably, a compressible fluid, such as Nitrogen gas, is in the chamber 88 below the piston 84. The pressure of this fluid is preferably greater than the hydrostatic pressure in the annulus 26 surrounding the apparatus 80. Thus, when pressure is applied to the annulus 26 with the valve 90 open, pressure in the annulus surrounding the apparatus 80 will be increased to a level at which it exceeds the pressure of the fluid in the chamber 88 below the piston 84 in order for the pistons 82, 84 to displace downwardly and increase the effective volume of the annulus.

Figure 5:
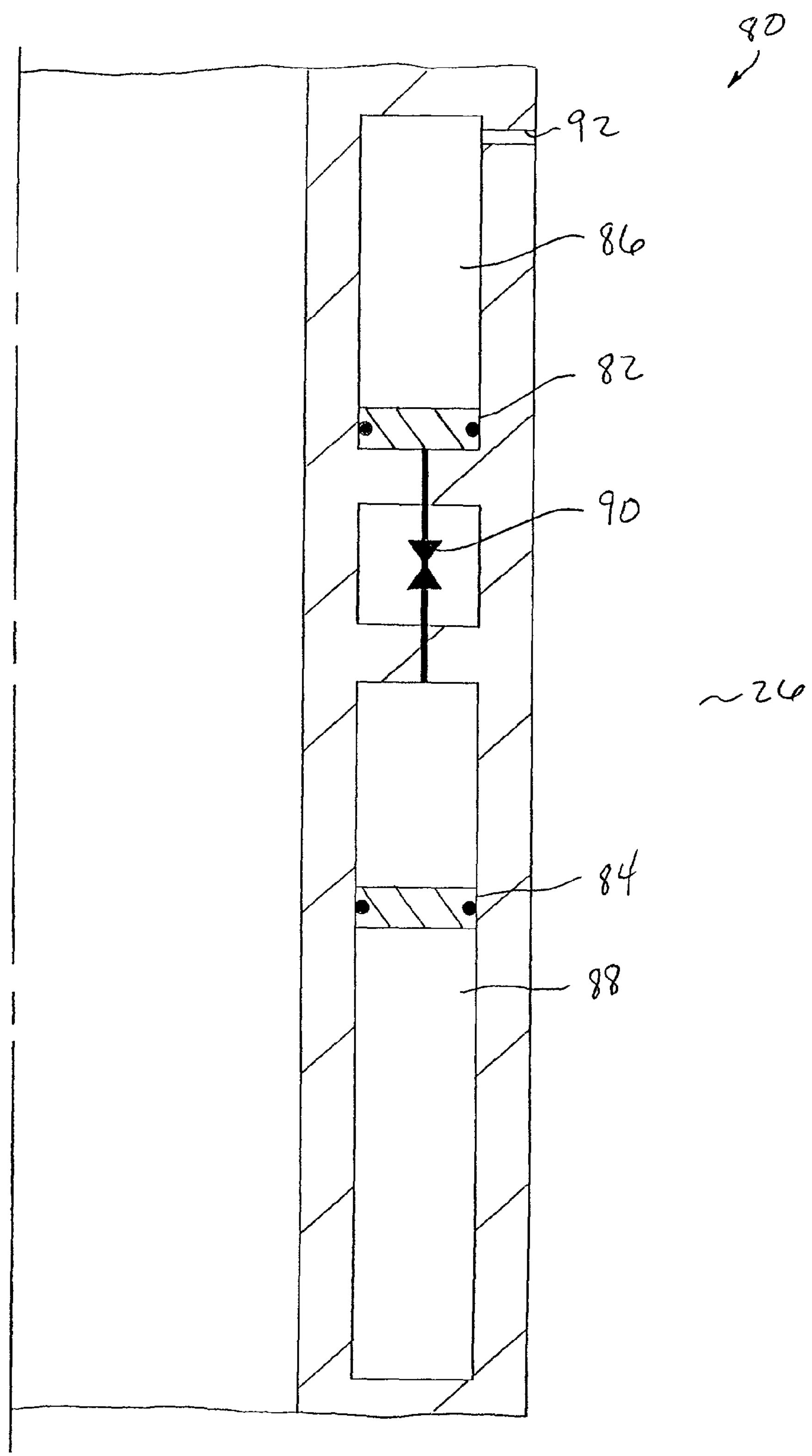
FIG. 5 is a schematic quarter-sectional view of the first apparatus, wherein fluid from an annulus has been accepted into the apparatus.

Referring additionally now to FIG. 5, the apparatus 80 is shown in a configuration in which pressure in the annulus 26 surrounding the apparatus has been increased to a level exceeding the initial pressure of the fluid in the chamber 88 below the lower piston 84, with the valve 90 open. Note that both of the pistons 82, 84 have displaced downwardly as compared to their respective positions as shown in FIG. 4. Downward displacement of the upper piston 82 has increased the effective volume of the annulus 26, so that more fluid volume must be pumped into the annulus 26 to achieve this increased pressure in the annulus, or less pressure increase in the annulus is achieved due to a given volume of fluid being pumped into the annulus.

Figure 6:
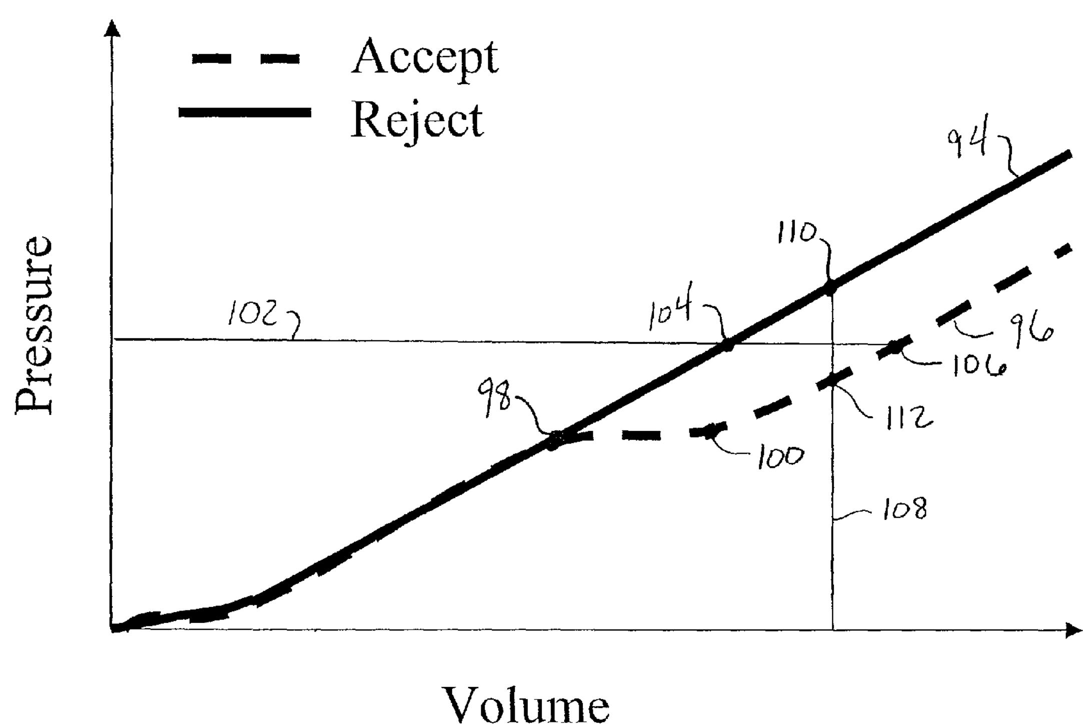
FIG. 6 includes plots of pressure vs. volume in the annulus.

Of course, if the valve 90 is closed when pressure in the annulus 26 is increased, the effective volume of the annulus will not be increased, even if the annulus pressure is increased so that it is greater than the fluid pressure in the chamber 88 below the lower piston 84. Depicted in FIG. 6 are pressure vs. volume plots showing a comparison between the two situations in which fluid is either accepted into the upper chamber 86 from the annulus 26 (thereby increasing the effective volume of the annulus), or is rejected from entering the upper chamber from the annulus.

The vertical axis indicates the pressure in the annulus 26 surrounding the apparatus 80. The horizontal axis indicates the volume of fluid added to the annulus 26 by the pump 36. The solid line plot 94 is characteristic of the situation where the valve 90 is closed, so that fluid from the annulus 26 is rejected from entering the chamber 86 when pressure in the annulus is increased. The dashed line plot 96 is characteristic of the situation where the valve 90 is open, so that fluid from the annulus 26 is accepted into the chamber 86.

Note that the plot 94 is substantially a straight line, illustrating the well-known linear relationship between fluid pressure and volume in a constant volume container. The plot 96 is also substantially linear up to a point 98, which occurs at the pressure level in the annulus 26 surrounding the apparatus 80 which equals the pressure of the fluid in the chamber 88 below the lower piston 84. At this point, additional fluid volume added to the annulus 26 serves to downwardly displace the pistons 82, 84, thereby increasing the effective volume of the annulus, without substantially increasing the annulus pressure.

Increased fluid volume added to the annulus 26 from point 98 to another point 100 does not cause a significant increase in pressure in the annulus 26, thus the plot 96 is substantially horizontal between the points 98, 100. At the point 100, the upper piston 82 has been displaced downwardly sufficiently far for it to bottom out (as depicted in FIG. 5), and the effective volume of the annulus 26 is no longer increased as fluid is added to the annulus 26. Therefore, the plot 96 again increases substantially linearly after the point 100.

It may now be fully appreciated how conveniently the position of the valve 90 may be determined at the remote location. For example, pressure in the annulus 26 surrounding the apparatus 80 may be increased to a predetermined level 102, which is greater than the fluid pressure in the chamber 88 below the lower piston 84. If the volume added to the annulus 26 to achieve this pressure level 102 is as indicated by point 104 on the plot 94, then the valve 90 is closed. If the volume added to the annulus 26 is as indicated by point 106 on the plot 96, then the valve 90 is open.

Alternatively, a predetermined volume 108 of fluid may be added to the annulus 26 to increase the pressure in the annulus surrounding the apparatus 80 20 so that it is greater than the fluid pressure in the chamber 88 below the lower piston 84. If the annulus pressure resulting from this fluid volume increase is as indicated by point 110 on the plot 94, then the valve 90 is closed. If the annulus pressure resulting from this fluid volume increase is as indicated by point 112 on the plot 96, then the valve 90 is open.

As another alternative, the computer 44 (which monitors the fluid pressure and volume changes in the annulus 26) may be programmed to search for characteristics which indicate whether the valve 90 is open or closed. For example, the computer 44 could easily be programmed to recognize the relatively horizontal characteristic of the plot 96 between the points 98, 100 as indicative of the valve 90 being open. The lack of such a characteristic would be indicative that the valve 90 is closed.

It will also be readily appreciated that, although the above discussion of the plots 94, 96 depicted in FIG. 6 has been given as though the determination of the position of the valve 90 is made when pressure is increased in the annulus 26, such a determination may also be made when pressure is decreased in the annulus. For example, if pressure in the annulus 26 surrounding the apparatus 80 is decreased a certain amount so that the pistons 82, 84 displace upwardly, then the amount of fluid released from the annulus will be indicative of whether the valve 90 is open or closed. Likewise, if a certain volume of fluid is released from the annulus 26, so that pressure in the annulus 26 surrounding the apparatus 80 is decreased so that the pistons 82, 84 displace upwardly, then the amount of pressure decrease in the annulus will be indicative of whether the valve 90 is open or closed.

Since fluid volume and pressure changes may be accurately measured at the remote location to determine the position of the valve 90 in the apparatus 80, the position of the valve may thus be used to communicate between the downhole system 12 and the remote location. For example, the closed position of the valve 90 may be used to represent a “0” value of a data bit, and the open position of the valve may be used to represent a “1” value of a data bit. Therefore, by appropriately positioning the valve 90 and changing the fluid volume and pressure in the annulus 26, data bits may be transmitted from the downhole system 12 to the remote location.

In the above description of the flowchart 58 depicted in FIG. 3, a telemetry bit was set in step 70 to correspond to a bit of a data byte. It may now be seen that the setting of this telemetry bit in step 70 corresponds to the open or closed position of the valve 90, so that the position of the valve corresponds to the value of the data bit. A pressure change in the annulus 26 produces an electrical power transmission to the controller module 18 which initially causes a data byte to be received into the controller module. This initial power transmission also causes the telemetry bit to be set so that it corresponds to the value of the first data bit. In response, the valve 90 may be actuated to its corresponding open or closed position (if it is not in the appropriate position already) during the same power transmission, or the telemetry bit may be stored in the memory 52 so that the valve is actuated on the next power transmission.

With the valve 90 appropriately actuated and fluid pressure and volume in the annulus 26 changed, the value of the first data bit may be determined at the remote location. This process is repeated for each data bit, until the entire byte of data is received at the remote location. A new data byte may then be read after the count is reset in step 78 of the flowchart 58, and the process of transmitting each bit of the new data byte is repeated.

Figure 7:
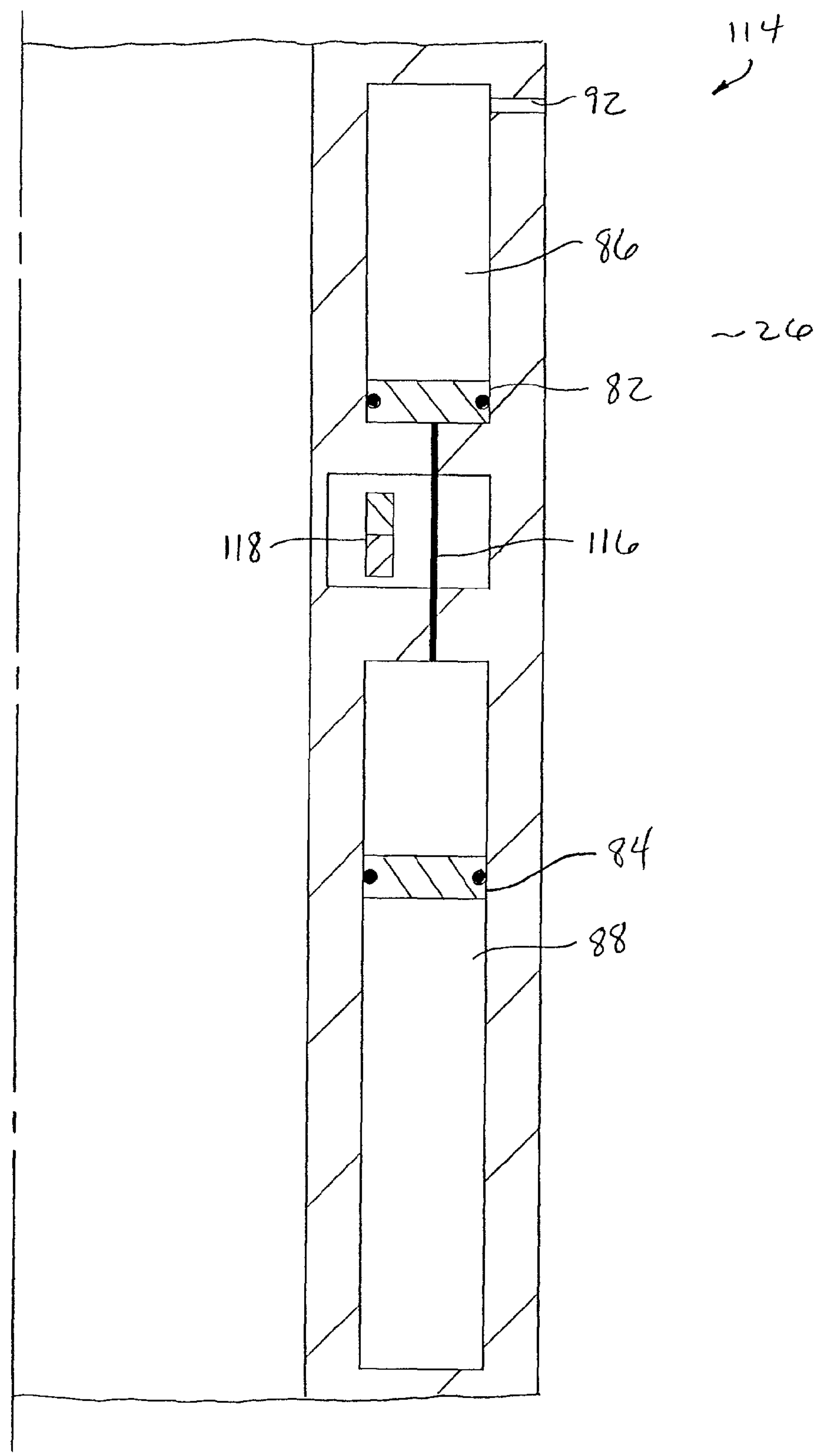
FIG. 7 is a schematic quarter-sectional view of a second apparatus which may be used in the method of FIG. 3.

Referring additionally now to FIG. 7, an alternate apparatus 114 which may be used for the telemetry module 14 in the system 12 is representatively illustrated. Of course, the apparatus 114 may be used in other systems and in methods other than the method 10 described above, without departing from the principles of the invention.

The apparatus 114 is similar in many respects to the apparatus 80 described above, and elements of the apparatus 114 which are similar to those of the apparatus 80 are indicated in FIG. 7 using the same reference numbers. The apparatus 114 may, however, be differently configured in keeping with the principles of the invention.

Note that the apparatus 114 does not include the conventional valve 90 of the apparatus 80. Instead, the valve device selectively permitting and preventing fluid flow between the chambers 86, 88 is a magnetorheological fluid disposed in a passage 116 interconnecting the chambers. The magnetorheological fluid takes the place of the fluid, such as oil, below the piston 82 in the chamber 86 in the apparatus 80, and which is flowed into the lower chamber 88 when the pistons 82, 84 displace downwardly. That is, the magnetorheological fluid flows downwardly through the passage 116, from the upper chamber 86 to the lower chamber 88, when the pistons 82, 84 displace downwardly.

The magnetorheological fluid is normally in a free-flowing liquid state. However, when a magnetic field having a requisite strength is passed through the fluid, it solidifies or becomes substantially solid. In the apparatus 114, the magnetorheological fluid in the passage 116 functions as a valve device to selectively permit and prevent fluid communication between the chambers 86, 88.

When the magnetorheological fluid in the passage 116 is solidified, fluid communication between the chambers 86, 88 is not permitted and the pistons 82, 84 will not displace in response to changes in pressure in the annulus 26 (similar to the valve 90 being closed in the apparatus 80). When the magnetorheological fluid in the passage 116 is liquid, fluid communication between the chambers 86, 88 is permitted, so that the pistons 82, 84 can displace in response to changes in pressure in the annulus 26 (similar to the valve 90 being open in the apparatus 80).

Figure 8:
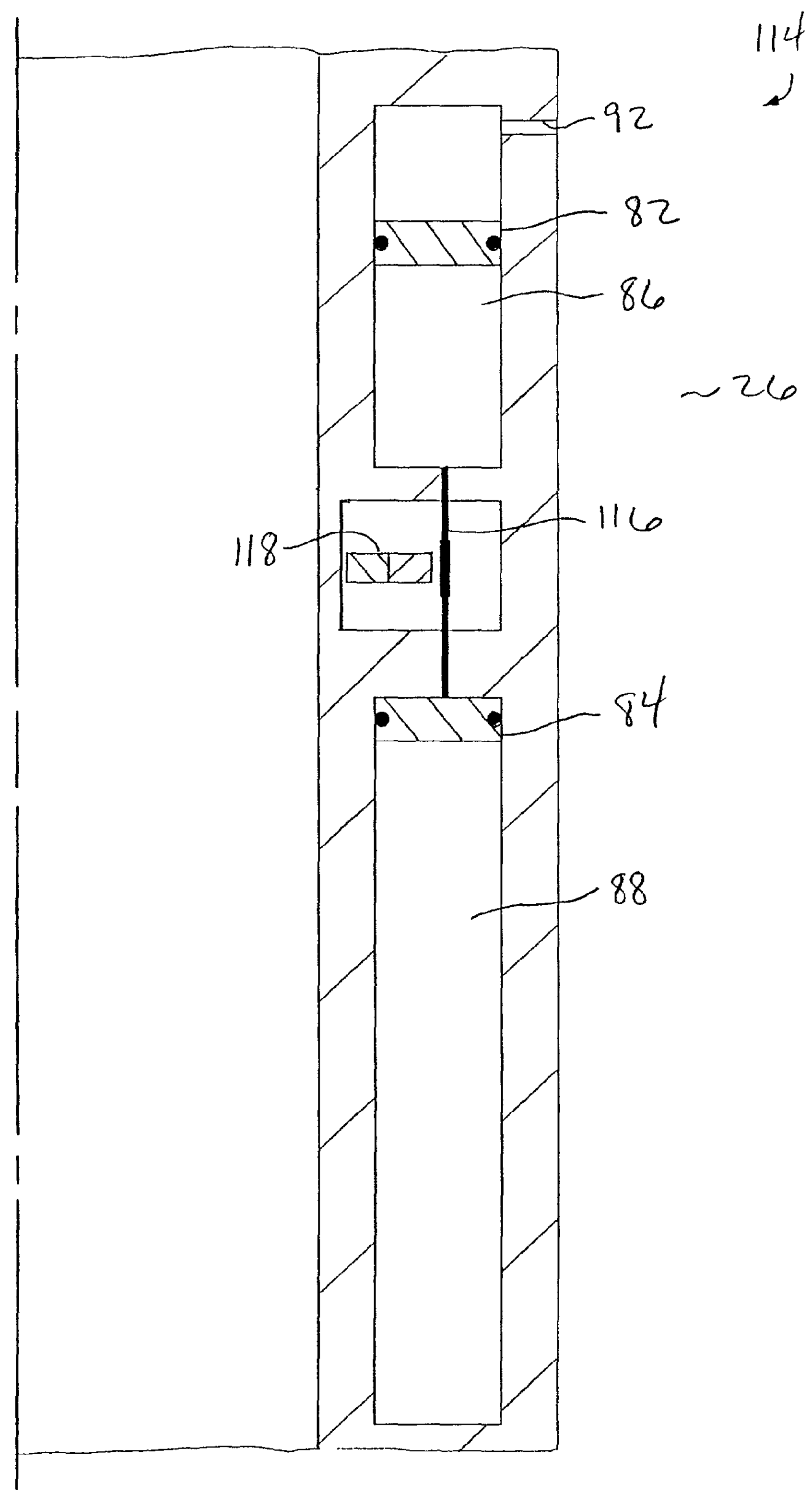
FIG. 8 is a schematic quarter-sectional view of the second apparatus, wherein fluid from the annulus is being rejected from the apparatus.

To selectively control the liquid and solid states of the magnetorheological fluid in the passage 116, a magnet 118 is positioned in close proximity to the passage. As depicted in FIG. 7, the magnet 118 is oriented so that its poles are substantially parallel to the passage 116, and so only a relatively weak magnetic field is experienced by the fluid in the passage due to the magnet, and the fluid remains in a liquid state. As depicted in FIG. 8, the magnet 118 has been rotated so that its poles are oriented perpendicular to the passage 116, and so a relatively strong magnetic field is experienced by the fluid in the passage, and the fluid is changed to its solid state.

It will be readily appreciated that the liquid and solid states of the magnetorheological fluid in the passage 116 may be determined at the remote location in the same manner as the open and closed positions of the valve 90 of the apparatus 80 may be determined at the remote location. It will also be readily appreciated that the setting of the telemetry bit in step 70 of the flowchart 58 may correspond to the positioning of the magnet 118 to represent the value of the corresponding data bit in the same manner as the setting of the telemetry bit corresponds to the positioning of the valve 90 in the apparatus 80. Therefore, the apparatus 114 may be used to transmit data from the system 12 to the remote location as pressure in the annulus 26 is changed.

Figure 9:
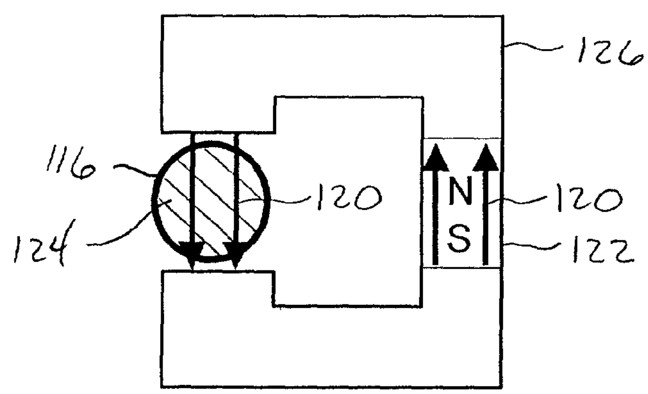
FIGS. 9–11 are schematic views of alternate actuation methods for the second apparatus.
Figure 10:
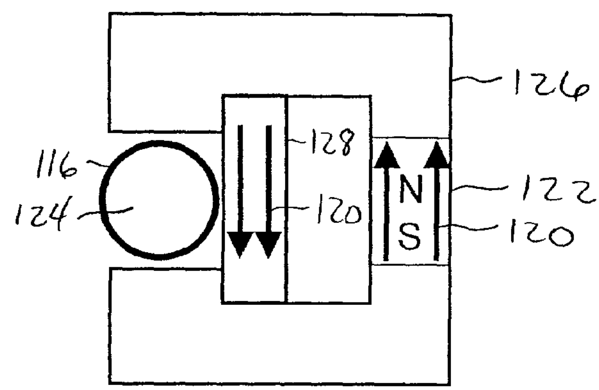
Figure 11:
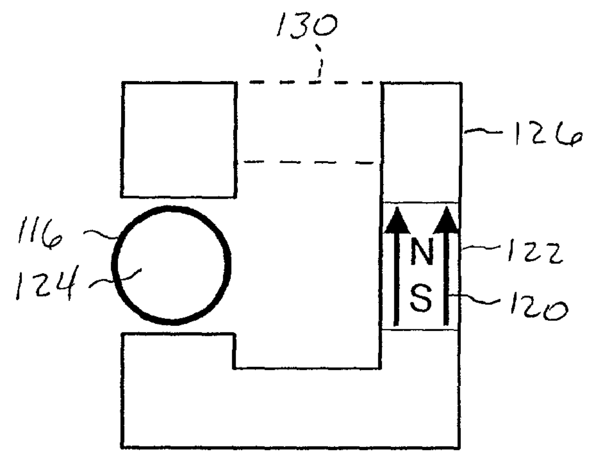

Instead of changing the position of the magnet 118, many other methods may be used to selectively change the state of the magnetorheological fluid in the passage 116. FIGS. 9–11 representatively illustrate a few of these alternate methods. Other methods may be used without departing from the principles of the invention.

In FIG. 9, the magnetic field 120 of a magnet 122 is directed through the magnetorheological fluid 124 in the passage 116 by means of a ferrous structure 126 of the type well known in the art. The fluid 124 is solidified by the magnetic field 120 passing therethrough, as indicated by the cross-hatching of the fluid in the passage 116 as depicted in FIG. 9.

In FIG. 10, another ferrous structure 128 has been positioned in the structure 126. The presence of the structure 128 "short circuits" the magnetic field 120, so that it is directed through the structure 128, instead of through the fluid 124 in the passage 116. The fluid 124 is not cross-hatched in FIG. 10 to indicate that it is in its liquid state.

Thus, the positioning of the structure 128 may be used to selectively permit and prevent fluid communication between the chambers 86, 88. The setting of the telemetry bit may be used to determine the positioning of the structure 128, to thereby represent the value of the corresponding data bit transmitted to the remote location.

In FIG. 11, a portion 130 of the structure 126 has been removed. The removal of the portion 130 prevents the magnetic field 120 from being directed to flow through the fluid 124 in the passage 116. The fluid 124 is not cross-hatched in FIG. 11 to indicate that it is in its liquid state.

Thus, the presence or absence of the portion 130 may be used to selectively prevent or permit fluid communication between the chambers 86, 88. The setting of the telemetry bit may be used to determine the positioning of the portion 130, to thereby represent the value of the corresponding data bit transmitted to the remote location.

Several alternate methods have been described above for communicating data from the downhole system 12 to the remote location using pressure changes in the annulus 26.

These methods permit long term monitoring of well parameters and, in the method 10 utilizing the annulus pressure operated downhole generator, this monitoring may be accomplished without the use of batteries or electrical lines extending to the surface.

However, it may at times be desirable to communicate from the remote location to the downhole system 12. For example, a command may be issued for the controller module 18 to select a particular one of the sensors 20, 22, 24 for monitoring, a command may be issued for the controller module to select a particular valve 32, 34 for actuation thereof, the processor 50 may be reprogrammed from the remote location, etc.

Since pressure changes in the annulus 26 are used for electrical power generation and for data communication from the downhole system 12 to the remote location, it would be convenient for these annulus pressure changes to also be available for use in communicating from the remote location to the downhole system. It would not be necessary, however, for the same annulus pressure changes to be used for all of these purposes or a particular combination of these purposes, although the use of the same annulus pressure changes for all of these purposes or any desired combination of these purposes is made possible by the principles of the invention described herein.

Figure 12:
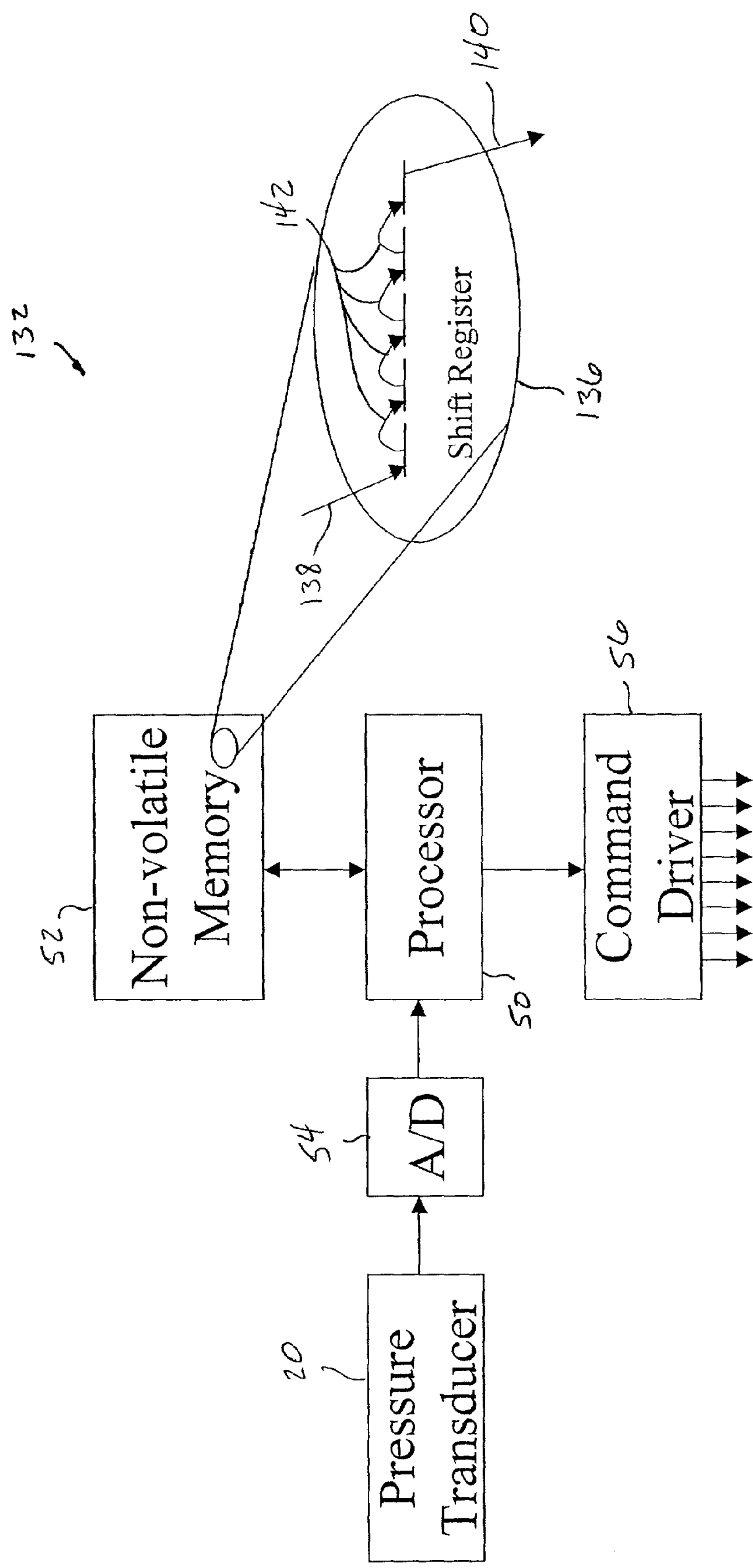
FIG. 12 is a schematic block diagram of a method of communicating with a downhole system which may be part of the method of FIG. 1.

Referring additionally now to FIG. 12, a schematic block diagram 132 is representatively illustrated for communication from the remote location to the downhole system 12. The block diagram 132 includes several of the elements of the block diagram 46 shown in FIG. 2 for communication from the downhole system 12 to the remote location.

Figure 13:
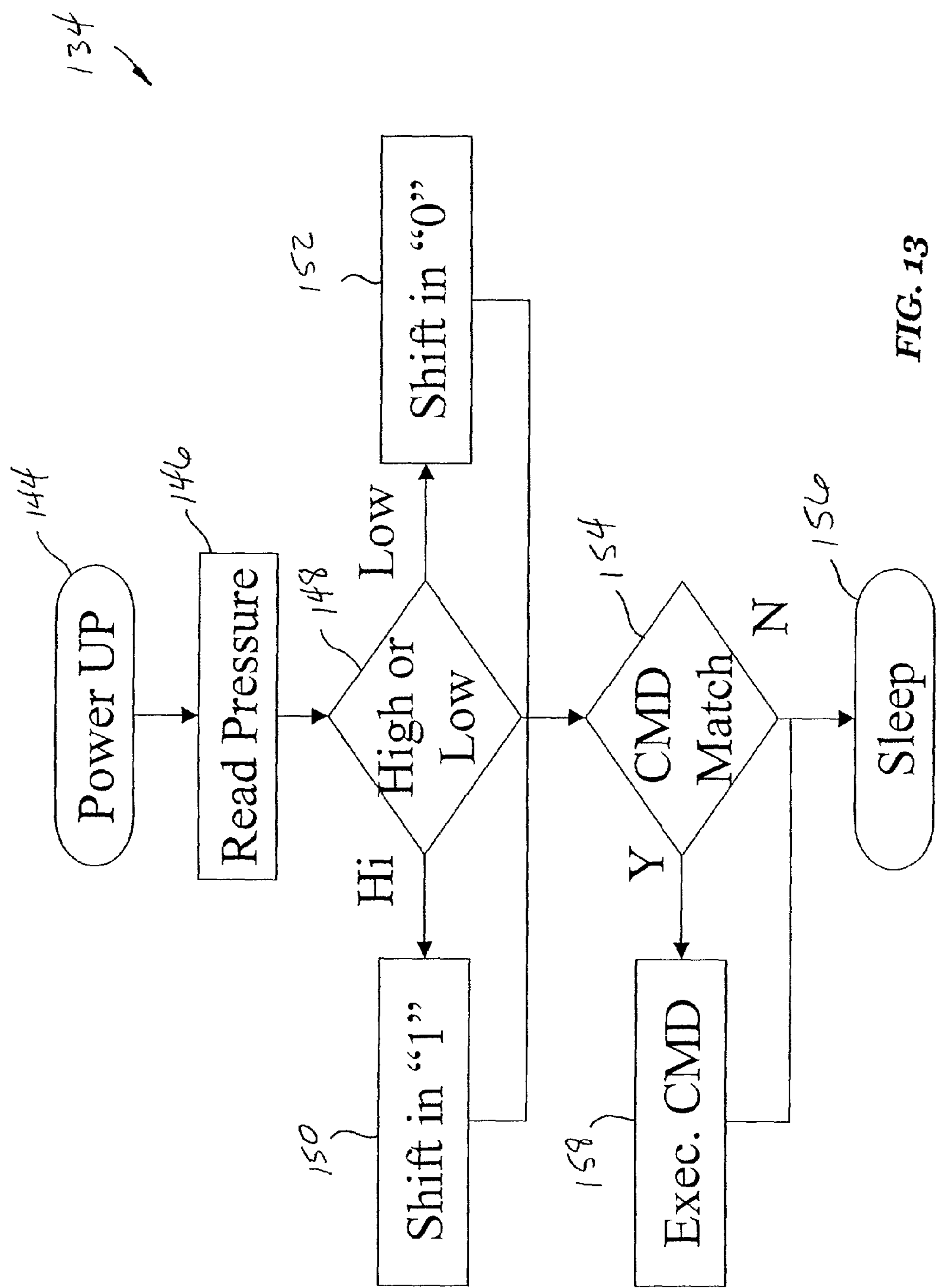
FIG. 13 is a flowchart illustrating steps in the method of FIG. 12.

A pressure transducer, such as the sensor 20, is used to monitor pressure in the annulus 26. The sensor's output is connected via the analog to digital converter 54 to the processor 50. The processor 50 is programmed to monitor the output of the sensor and detect when a change in annulus pressure indicates a lo value of a communication bit. A flowchart 134 illustrating this programming is illustrated in FIG. 13 and is described below.

When the processor 50 determines that a change in annulus pressure indicates a value of a communication bit, the bit value is stored in the nonvolatile memory 52. Specifically, the memory 52 includes a shift register 136. The shift register 136 has a predetermined number of places corresponding to the number of bits in a communication byte.

When a new bit value is stored in the shift register 136 (indicated by arrow 138 in FIG. 12), the oldest bit value stored in the shift register is discarded (indicated by arrow 140 in FIG. 12), and each of the remaining bit values are shifted over one place in the shift register (indicated by arrows 142 in FIG. 12). This manner of operation of a shift register is well known to those skilled in the art.

Thus, the byte indicated by the stored bit values in the shift register 136 changes as each new bit value is stored therein. To send a desired communication byte from the remote location to the downhole system 12, the appropriate annulus pressure changes are made at the remote location so that the processor 50 thereby detects a corresponding succession of bit values, which are stored in succession in the shift register 136. When the processor 50 recognizes that an appropriate communication byte has been stored in the shift register 136, the processor performs a corresponding programmed function, executes a command, records an instruction, etc.

Referring additionally now to FIG. 13, the flowchart 134 shows representatively how annulus pressure changes may be used to communicate from the remote location to the downhole system 12. As with the "power up" step 60 in the flowchart 58 shown in FIG. 2, a "power up" step 144 is used in the flowchart 134 to indicate that a transmission of electrical power is received at the controller module 18. This "power up" step 144 may occur at the same time as the previously described "power up" step 60, they may occur on alternate pressure increases or decreases in annulus pressure, etc.

In step 146, pressure in the annulus 26 is read. As described above, the sensor 20 may be used to input this data to the processor 50 via the analog to digital converter 54. Preferably, an appropriate time delay is used to permit the annulus pressure to reach its maximum level.

In step 148, the maximum annulus pressure read in step 146 is compared to predetermined high and low levels used to indicate communication bit values. For example, a maximum annulus pressure of between 500 and 1000 psi may be a low level which indicates a bit value of "0", while a maximum annulus pressure of over 1000 psi may be a high level which indicates a bit value of "1".

Step 150 is performed if it is determined that a bit value of "1" is indicated by the maximum annulus pressure. A "1" bit value is shifted into the shift register 136.

Alternatively, step 152 is performed if it is determined that a bit value of "0" is indicated by the maximum annulus pressure. A "0" bit value is shifted into the shift register 136.

If the maximum annulus pressure does not indicate either bit value, then no bit value is stored in the shift register 136. In any event, the next step 154 is to compare the byte stored in the shift register 136 to a series of preprogrammed bytes. For example, a preprogrammed command byte may be used to cause the processor 50 to perform a certain function, such as select one of the sensors 20, 22, 24 for monitoring, select one of the valves 32, 34 for actuation, etc.

If the byte stored in the shift register 136 matches the preprogrammed byte, then the function is performed or the command is executed in step 158. After the function is performed or the command is executed in step 158, or if no match is found in step 154, the controller module 18 resumes its sleep mode in step 156, which may occur when electrical power transmission to the controller module ceases. Since the bit values in the shift register 136 are stored in the nonvolatile memory 52, they remain in the shift register when the next "power up" step 144 is performed.

Although the above description of the flowchart 134 has been given as though communication bits are transmitted from the remote location to the downhole system 12 by increasing annulus pressure to certain maximum values to indicate corresponding bit values, it will be readily appreciated that annulus pressure decreases to certain levels or other annulus pressure changes could also, or alternatively, be used to indicate bit values.

Figure 14:
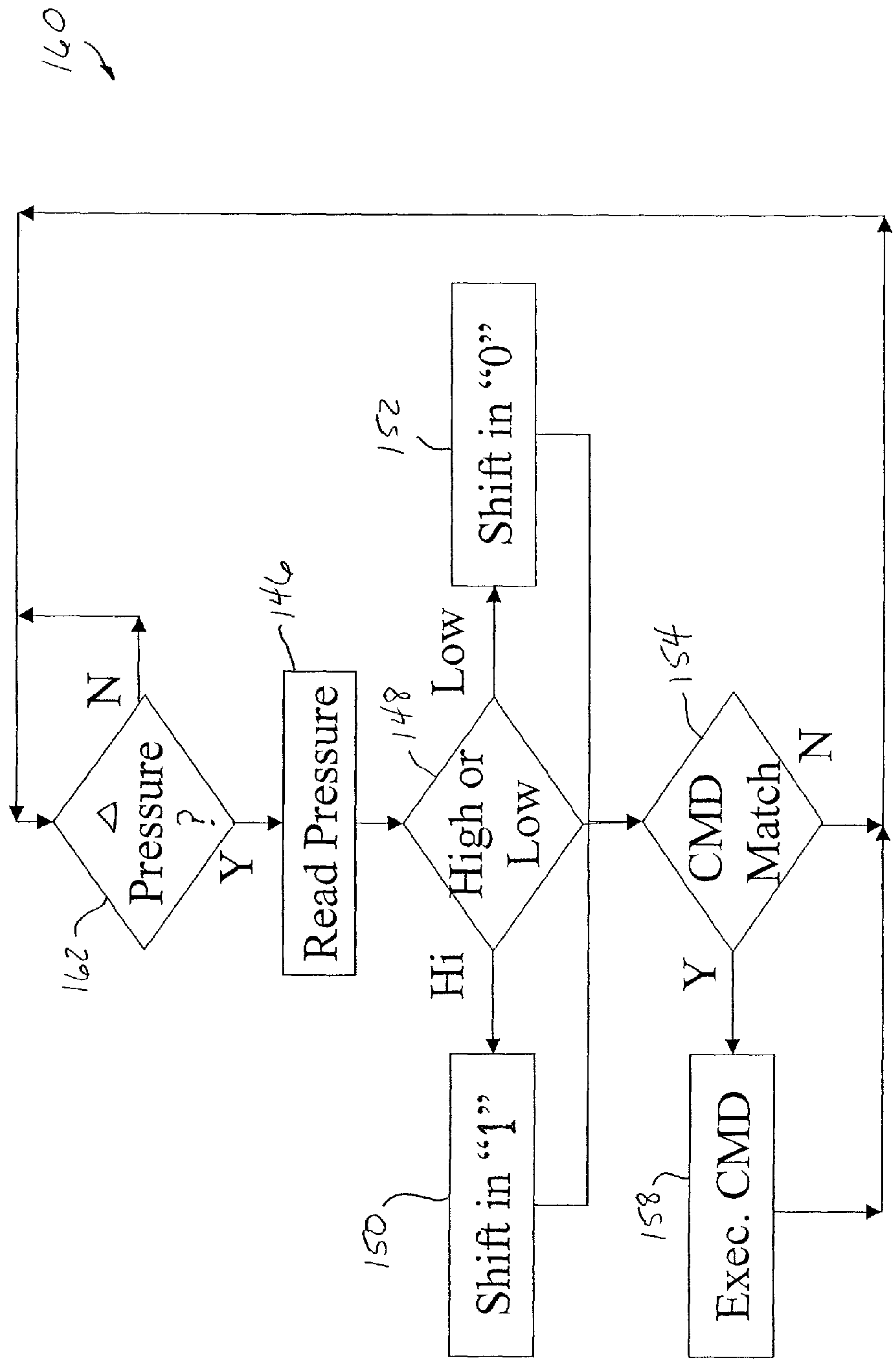
FIG. 14 is a flowchart illustrating alternate steps in the method of FIG. 12.

Referring additionally now to FIG. 14, a flowchart 160 is representatively illustrated which is somewhat similar to the flowchart 134 described above. However, the flowchart 160 includes changes which may be made to the communication method if continuous electrical power is available downhole. Steps shown in the flowchart 160 which are similar to steps of the flowchart 134 are indicated in FIG. 14 using the same reference numbers.

One significant difference between the flowcharts 134, 160 is that there are no "power up" or "sleep" steps in the flowchart 160. Since continuous power is available downhole in the situation represented in flowchart 160, these steps are not needed.

However, since the transmission of electrical power to the controller module 18 is not intermittent in the flowchart 160, the transmission of electrical power is also not used to begin the steps in the communication method. Instead, pressure in the annulus is continuously monitored by the processor 50 and the steps of the flowchart 160 are performed when the processor determines that a predetermined change in the annulus pressure has occurred.

In step 162, a determination is made whether a change in annulus pressure has occurred. This change in annulus pressure may be an increase to a certain level, a decrease to a certain level, a change of a certain amount in either direction, etc. If the predetermined change in annulus pressure is not detected, then step 162 is repeated.

If the predetermined change in annulus pressure is detected, then the method proceeds to step 146. From this point, the flowchart 160 is substantially similar to the flowchart 134 described above. However, after step 154, and possibly step 158, has been performed, instead of progressing to the sleep state, the processor 50 again goes to step 162 to determine when another change in annulus pressure occurs.

It may now be fully appreciated that the present invention provides convenient, economical, straightforward communication between the downhole system 12 and the remote location through the use of annulus pressure changes. These annulus pressure changes may also be used to provide electrical power to the downhole system 12, so that it is self-contained and suitable for long term monitoring of well parameters and control of production from the well.

For example, pressure increases in the annulus 26 may be used to perform all sensor monitoring, communicating and command executing functions while pressure decreases are used to operate a cooling system for the downhole system 12 electronics. That is, the electrical power generated by pressure increases would power the downhole system 12 electronics while readings from the sensors 20, 22, 24 are taken, the telemetry bit is set, the valve device 90 or 116, 124 is operated, well tools 32, 34 are actuated, bit and count values are stored in memory 52. Each pressure increase could, thus, result in a data bit being transmitted from the downhole system 12 to the remote location and a command bit being transmitted from the remote location to the downhole system. Alternatively, electrical power generated by pressure decreases could be used to power the downhole system 12 electronics and pressure increases could be used to operate the cooling system.

As another alternative, pressure increases could be used to power some of the functions of the downhole system 12 electronics, such as communication between the downhole system and the remote location (e.g., monitoring annulus pressure, storing bit and count values, etc.) and pressure decreases could be used to power other functions (e.g., operating the valve device 90 or 116, 124, actuating well tools 32, 34, etc.). These could also be reversed, so that pressure decreases are used to power communication functions and pressure increases are used to power the other functions.

If continuous power is available downhole, then communication between the downhole system 12 and the remote location is available whenever changes in annulus pressure are made.

Pressure increases may be used to communicate data from the downhole system 12 to the remote location and pressure decreases may be used to communicate commands or instructions from the remote location to the downhole system. These may be reversed, or communication may occur in both directions simultaneously in response to pressure increases or pressure decreases. There need not be any relationship at all between the different communication modes, since each utilizes a method of operation which does not interfere with the other.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A method of communicating between a downhole system and a remote location using intermittent electrical power, the method comprising the steps of:

receiving in the downhole system a series of spaced apart transmissions of electrical power, the system being powered by the electrical power transmissions;

setting a first telemetry bit to indicate a first bit value of a first byte of data in response to a first one of the electrical power transmissions;

communicating the first bit value to the remote location;

setting a second telemetry bit to indicate a second bit value of the first byte of data in response to a second one of the electrical power transmissions; and communicating the second bit value to the remote location.

2. The method according to claim 1, wherein the first bit value communicating step is performed in response to the first one of the electrical power transmissions, and wherein the second bit value communicating step is performed in response to the second one of the electrical power transmissions.

3. The method according to claim 2, further comprising the steps of generating the first one of the electrical power transmissions in response to a first pressure manipulation, and generating the second one of the electrical power transmissions in response to a second pressure manipulation.

4. The method according to claim 3, wherein the first electrical power transmission generating step further comprises performing the first pressure manipulation in an annulus formed between a tubular string and a wellbore, and wherein the second electrical power transmission generating step further comprises performing the second pressure manipulation in the annulus.

5. The method according to claim 1, wherein the first bit value communicating step is performed in response to a third one of the electrical power transmissions, and wherein the second bit value communicating step is performed in response to a fourth one of the electrical power transmissions.

6. The method according to claim 1, further comprising the step of incrementing a count value in response to each of the electrical power transmissions.

7. The method according to claim 6, further comprising the step of storing the count value between electrical power transmissions.

8. The method according to claim 7, wherein the storing step further comprises storing the count value in a nonvolatile memory which is not powered between the electrical power transmissions.

9. The method according to claim 6, further comprising the step of resetting the count value when a preselected number of bit values of the first byte are communicated to the remote location.

10. The method according to claim 9, further comprising the step of communicating bit values of a second byte of data after the resetting step.

11. The method according to claim 1, wherein the first telemetry bit setting step further comprises selecting a mode of actuation of a valve device.

12. The method according to claim 11, wherein the first telemetry bit communicating step further comprises selectively accepting and rejecting fluid flow through the valve device in response to the mode of actuation selecting step.

13. The method according to claim 12, wherein the selectively accepting and rejecting fluid flow step further comprises selectively accepting and rejecting fluid flow between the downhole system and an annulus surrounding the system.

14. The method according to claim 1, further comprising the step of taking a reading from a downhole sensor to acquire the first byte of data.

15. The method according to claim 14, wherein the reading taking step is performed in response to a third one of the electrical power transmissions.

16. The method according to claim 1, wherein the first telemetry bit setting and second telemetry bit setting steps are performed in response to separate ones of a series of pressure increases.

17. The method according to claim 16, wherein the first bit value communicating and second bit value communicating steps are performed in response to separate ones of a series of pressure decreases alternating with the pressure increases.

18. The method according to claim 16, wherein the first telemetry bit setting and first bit value communicating steps are performed in response to a first one of the pressure increases, and wherein the second telemetry bit setting and second bit value communicating steps are performed in response to a second one of the pressure increases.

19. The method according to claim 1, wherein the first telemetry bit setting and second telemetry bit setting steps are performed in response to separate ones of a series of pressure decreases.

20. The method according to claim 19, wherein the first bit value communicating and second bit value communicating steps are performed in response to separate ones of a series of pressure increases alternating with the pressure decreases.

21. The method according to claim 19, wherein the first telemetry bit setting and first bit value communicating steps are performed in response to a first one of the pressure decreases, and wherein the second telemetry bit setting and second bit value communicating steps are performed in response to a second one of the pressure decreases.

* * * * *